(12) United States Patent
Ogawa

(10) Patent No.: US 9,581,225 B2
(45) Date of Patent: Feb. 28, 2017

(54) CONTINUOUSLY VARIABLE TRANSMISSION

(71) Applicant: Toyota Jidosha Kabushiki Kaisha, Toyota-shi, Aichi-ken (JP)

(72) Inventor: Hiroyuki Ogawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/700,828

(22) Filed: Apr. 30, 2015

(65) Prior Publication Data

US 2015/0345599 A1  Dec. 3, 2015

(30) Foreign Application Priority Data

May 30, 2014  (JP) ................................ 2014-113358

(51) Int. Cl.
*F16H 15/52* (2006.01)
*F16H 15/28* (2006.01)

(52) U.S. Cl.
CPC .............. *F16H 15/52* (2013.01); *F16H 15/28* (2013.01)

(58) Field of Classification Search
None
See application file for complete search history.

(56) References Cited

FOREIGN PATENT DOCUMENTS

| EP | 2342479 B1 | 5/2013 |
|---|---|---|
| JP | 2012-506001 A | 3/2012 |
| JP | 2012-225390 A | 11/2012 |
| JP | 2014-202267 A | 10/2014 |
| WO | 2010-044778 A1 | 4/2010 |

*Primary Examiner* — Erin D Bishop
(74) *Attorney, Agent, or Firm* — Dinsmore & Shohl LLP

(57) ABSTRACT

A continuously variable transmission includes: first to third power transmission components; a rolling component; a support shaft for the rolling component; a first guide member that includes a first guide portion for guiding a first protrusion portion of the inserted support shaft; a gear shift member that includes a gear change portion; a first actuator which tilts each rolling component by moving each second protrusion portion along the gear change portion with rotation of the gear shift member at a time an input-output gear ratio is changed; a second guide member that includes a second guide portion for guiding a second protrusion portion of the inserted support shaft; and a second actuator which prohibits rotation of the second guide member during reverse rotation of the first and second power transmission components and allows rotation of the second guide member during normal rotation of the first and second power transmission components.

6 Claims, 11 Drawing Sheets

FIG.10
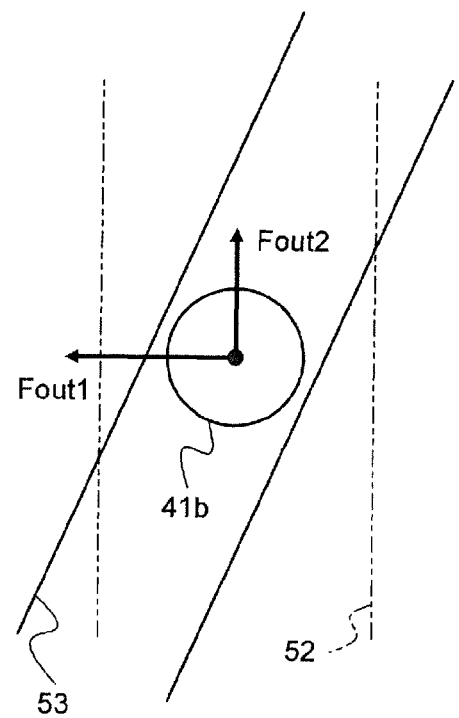
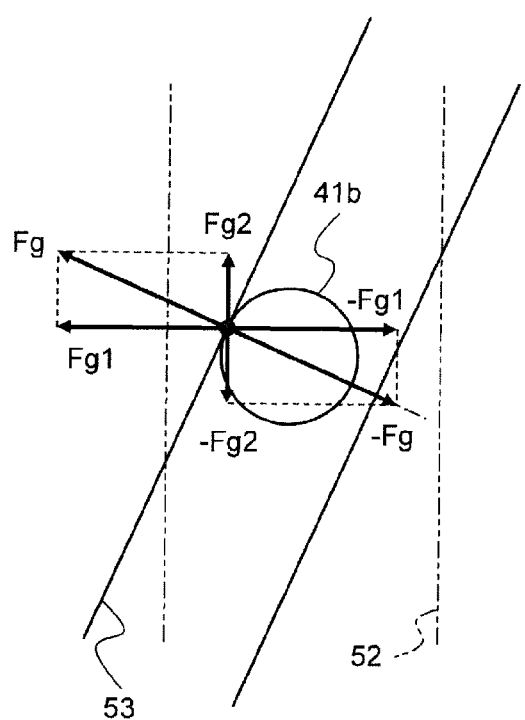

CONTINUOUSLY VARIABLE TRANSMISSION

CROSS-REFERENCE TO RELATED APPLICATION(S)

The present application claims priority to and incorporates by reference the entire contents of Japanese Patent Application No. 2014-113358 filed in Japan on May 30, 2014.

BACKGROUND OF THE INVENTION

1. Field of the Invention

The present invention relates to a traction drive type continuously variable transmission that continuously changes an input-output gear ratio.

2. Description of the Related Art

Conventionally, for example, a ball planetary type continuously variable transmission disclosed in Japanese National Publication of International Patent Application No. 2012-506001 and Japanese Patent Application Laid-open No. 2012-225390 is known. The continuously variable transmission includes three power transmission components (two disks or two rings and a sun roller) which have a common rotation axis, rolling components (planet balls) which are radially disposed with respect to the rotation axis and are sandwiched by the three power transmission components, and holding components (carriers) which respectively hold the planet balls in a tiltable and spinnable manner through both ends of a support shaft. Each holding component includes two disk-shaped plates of which the center axes match the rotation axis. In the continuously variable transmission disclosed in Japanese National Publication of International Patent Application No. 2012-506001, one plate (a rotation plate) is rotated with respect to the other plate (a fixed plate) about the rotation axis, so that each rolling component is tilted along with each support shaft. For this reason, the fixed plate is provided with a guide portion which guides one end of the support shaft in the radial direction of the plate. Further, the rotation plate is provided with a gear change portion (that is, the gear change portion which tilts the guide portion of the fixed plate in the circumferential direction of the plate) of which the longitudinal direction is tilted in the circumferential direction of the plate with respect to the radial direction of the plate. The other end of the support shaft is inserted into the gear change portion and moves along the gear change portion with the rotation of the rotation plate. Further, in the continuously variable transmission disclosed in Japanese Patent Application Laid-open No. 2012-225390, a different fixed plate is provided between the rotation plate and each rolling component so as not to be rotatable as in the fixed plate. The different fixed plate is provided with a guide portion which guides the other end of the support shaft in the radial direction.

In such a continuously variable transmission, a fixed plate is provided between the rotation plate and each rolling component. Therefore, a skew generated by a deviation of the rotation axes of the rolling components is not generated because of the two fixed plates, and a gear ratio cannot be assured during normal rotation. In that case, it can be considered that the fixed plate provided between the rotation plate and each rolling component is made rotatable to generate a skew for assuring the gear ratio during the normal rotation. However, if the fixed plate is made rotatable, when the rotation directions of the first and second power transmission components are reversed, the forces applied therebetween do not match each other. For this reason, a divergence in skew angle occurs. As a result, there is a possibility that the rotation of the support shaft of the rolling component may be locked, for example, because the support shaft of the rolling component moves along the guide portion, an inclination angle thereof becomes maximum, and therefore, a ball support shaft on a fixed carrier side might be bitten into a bottom of the guide portion. That is, there is a possibility that the power may not be transmitted or the gear ratio may not be changed after the transmission of the power during the reverse rotation of the first and second power transmission components.

SUMMARY OF THE INVENTION

It is an object of the present invention to at least partially solve the problems in the conventional technology.

According to one aspect of the present invention, there is provided a continuously variable transmission including: first to third power transmission components which have a first rotation axis commonly set for each other and are relatively rotatable in a circumferential direction with respect to the first rotation axis; a rolling component which has a second rotation axis, is radially disposed at a plurality of positions about the first rotation axis on an outer peripheral surface of the third power transmission component, and is sandwiched between the first and second power transmission components disposed to face each other; a support shaft for the rolling component which is concentric with the second rotation axis and of which both ends protrude from the rolling component; a first guide member that includes a first guide portion for guiding a first protrusion portion of the support shaft inserted thereinto in a radial direction with respect to the first rotation axis and is not rotatable; a gear shift member that includes a gear change portion, into which the second protrusion portion is inserted and of which a longitudinal direction is tilted with respect to the radial direction so that forces applied between the second protrusion portion and a side wall of the gear change portion match each other during normal rotation of the first and second power transmission components, and is rotatable in the circumferential direction; a first actuator which tilts each rolling component by moving each second protrusion portion along the gear change portion with rotation of the gear shift member at a time an input-output gear ratio is changed; a second guide member that includes a second guide portion for guiding a second protrusion portion of the inserted support shaft in the radial direction and is rotatable in the circumferential direction by applying a force to a side wall of the second guide portion; and a second actuator which prohibits rotation of the second guide member at a position where the first guide portion and the second guide portion face each other in an axial direction of the first rotation axis by engaging a second engagement portion of the second guide member with a first engagement portion thereof during reverse rotation of the first and second power transmission components and allows rotation of the second guide member by operating the second engagement portion so that an engagement state with respect to the first engagement portion is released during the normal rotation of the first and second power transmission components.

The above and other objects, features, advantages and technical and industrial significance of this invention will be better understood by reading the following detailed descrip-

BRIEF DESCRIPTION OF THE DRAWINGS

FIG. 10 is a diagram illustrating a force applied between a second protrusion portion and a side wall of a gear change portion during the normal rotation;

DETAILED DESCRIPTION OF THE PREFERRED EMBODIMENTS

Figure 1:
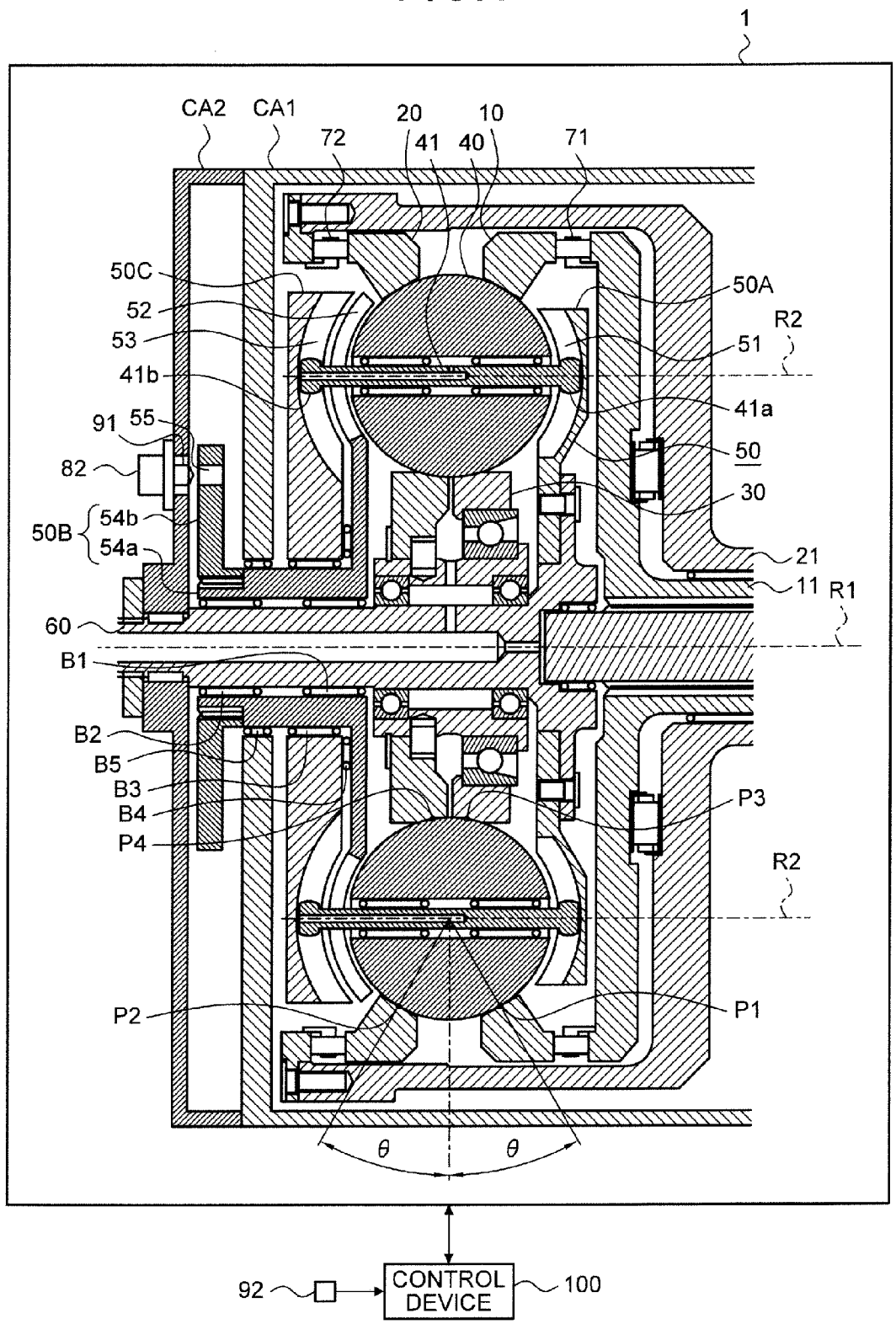
FIG. 1 is a diagram illustrating an example of a configuration of a continuously variable transmission according to an embodiment of the invention.

Hereinafter, an embodiment of a continuously variable transmission according to the invention will be described with reference to the drawings. Furthermore, the invention is not limited to the embodiment.

An embodiment of a continuously variable transmission according to an embodiment of the invention will be described with reference to FIGS. 1 to 13.

The continuously variable transmission in the embodiment is a so-called traction drive type continuously variable transmission, and a ball planetary type continuously variable transmission will be representatively exemplified.

The continuously variable transmission includes first to third power transmission components, rolling components, and holding components. The first to third power transmission components include a first rotation axis R1 which is commonly set therebetween, and hence are relatively rotatable in the circumferential direction with respect to the first rotation axis R1. Each of the rolling components includes a second rotation axis R2. Here, the rolling components are radially disposed on the outer peripheral surface of the third power transmission component about the first rotation axis R1, and are sandwiched by the first and second power transmission components disposed to face each other. The holding components respectively hold the rolling components so that the rolling components may be tilted and spun.

In the description below, a direction following the first rotation axis R1 is set as the axial direction and a direction around the first rotation axis R1 is set as the circumferential direction unless otherwise specified. Further, a direction perpendicular to the first rotation axis R1 is set as the radial direction. Here, the inside in the radial direction is set as the inner radial direction and the outside in the radial direction is set as the outer radial direction.

The tilting operation of the rolling component indicates the movement of the second rotation axis R2 with respect to the first rotation axis R1 on a tilting plane including the second rotation axis R2 and the first rotation axis R1. Specifically, an operation of changing the shortest distance from the second rotation axis R2 to the contact portion between the first power transmission component and the rolling component and the shortest distance from the second rotation axis R2 to the contact portion between the second power transmission component and the rolling component will be referred to as the tilting operation. In the continuously variable transmission, the input-output gear ratio γ is continuously changed by tilting the rolling components at the same tilting angle along with the support shaft. The support shaft indicates a rotation shaft which is concentric with the second rotation axis R2, and supports the rolling component in a spinnable manner while both ends thereof protrude from the rolling component. The holding component holds the rolling component through both ends of the support shaft thereof. In other words, the tilting plane indicates a plane which is formed by the locus of the second rotation axis R2 during the tilting operation while a skew to be described later does not occur.

The continuously variable transmission may transmit a torque (power) among the first to third power transmission components through the rolling components by generating a traction force (a tangential force) in the first to third power transmission components with respect to the rolling components. The traction force is generated when at least one of the first and second power transmission components is pressed by the rolling components.

In the continuously variable transmission, any one of the first to third power transmission components becomes a torque input portion, and the other different from the above-described one becomes a torque output portion. The continuously variable transmission is disposed on, for example, the power transmission path of the vehicle. At that time, the input portion is connected to a power source of an engine (an internal combustion engine or the like) or a rotary machine (a motor or the like) and the output portion is connected to a drive wheel. Furthermore, there is a case where a different transmission (for example, a stepped manual transmission or an automatic transmission) may be interposed between the continuously variable transmission and the drive wheel.

Hereinafter, a specific example of the continuously variable transmission will be described with reference to FIG. 1. FIG. 1 illustrates a ball planetary type continuously variable transmission 1 of the embodiment.

In the continuously variable transmission 1, the first and second power transmission components serve as ring gears of a traction planetary mechanism. Further, the third power transmission component and the holding component respectively serve as a sun roller and a carrier of the traction planetary mechanism. Further, the rolling component serves as a ball type pinion in the traction planetary mechanism. Thus, the continuously variable transmission 1 includes first and second power transmission members 10 and 20 that serve as first and second power transmission components, a sun roller 30 that serves as a third power transmission component, a planet ball 40 that serves as a rolling component, a carrier 50 that serves as a holding component, and a shaft 60 that serves as a transmission shaft concentric with the first rotation axis R1. The shaft 60 is a columnar or cylindrical fixed shaft which is fixed to a fixed portion of the continuously variable transmission 1 in a vehicle body or a casing (not illustrated) and is formed so as not to be rotatable with respect to the fixed portion. In the continuously variable transmission 1, a state where the first rotation axis R1 is parallel to the second rotation axis R2 on the tilting plane (a state of FIG. 1) is set as a reference position.

The first and second power transmission members 10 and 20 are disk members (disks) or annular members (rings) of which the center axes match the first rotation axis R1 and are disposed so as to face each other in the axial direction. In this example, both power transmission members are formed as annular members. The first and second power transmission members 10 and 20 sandwich each planet ball 40 from the outer radial direction of each a planet ball 40. For this reason, contact portions P1 and P2 are respectively formed at the position between the first power transmission member 10 and the planet ball 40 and the position between the second power transmission member 20 and the planet ball 40 by the point contact (precisely, the oval plane contact). The contact portions P1 and P2 of the first and second power transmission members 10 and 20 are formed in a shape so that a force (a normal force) is applied from the first and second power transmission members 10 and 20 to the planet ball 40 in the inner radial direction and the inclined direction when a force (an axial force to be described later) is applied to the first and second power transmission members 10 and 20 in a direction toward the planet ball 40 in the axial direction.

In the continuously variable transmission 1, the shortest distance from the second rotation axis R2 to one of the contact portions P1 and P2 is set to be equal to the shortest distance from the second rotation axis R2 to the other of the contact portions P1 and P2 in the reference position. Further, in the continuously variable transmission 1, a contact angle θ between one of the first and second power transmission members 10 and 20 and each planet ball 40 is set to be equal to the contact angle θ between the other of the first and second power transmission members 10 and 20 and each planet ball 40. The contact angle θ indicates an angle which is formed by the line connecting each of the contact portions P1 and P2 with respect to the reference plane and the center (which is a spinning center and a tilting center and corresponds to a center in the case of a sphere) of the planet ball 40. The reference plane indicates a plane which is widened in the radial direction having the center of each planet ball 40.

In the embodiment, the first power transmission member 10 is used as the torque input portion from the power source and the second power transmission member 20 is used as the torque output portion to the drive wheel. For this reason, an input shaft (a first rotation shaft) 11 which is concentric with the first power transmission member 10 is connected to the first power transmission member 10 and an output shaft (a second rotation shaft) 21 which is concentric with the second power transmission member 20 is connected to the second power transmission member 20.

The input shaft 11 may rotate in the circumferential direction with respect to the shaft 60 along with the first power transmission member 10. Further, the output shaft 21 may rotate in the circumferential direction with respect to the shaft 60 along with the second power transmission member 20. The input shaft 11 and the output shaft 21 may relatively rotate in the circumferential direction. The input shaft 11 in this example extends in, for example, the axial direction near the power source. Then, the output shaft 21 extends in the same direction as the input shaft 11 while covering the input shaft 11 from the outer radial direction.

The traction force Ft is generated in response to a traction coefficient μt and a normal force Fn based on the force (the axial force) in the axial direction (Ft=μt×Fn). A first axial force generation device 71 which generates an axial force causing the traction force Ft is provided between the first power transmission member 10 and the input shaft 11. Further, a second axial force generation device 72 which generates an axial force is provided between the second power transmission member 20 and the output shaft 21. For example, when one of the first power transmission member 10 and the input shaft 11 rotates, the first axial force generation device 71 generates an axial force therebetween. For example, when one of the second power transmission member 20 and the output shaft 21 rotates, the second axial force generation device 72 generates an axial force therebetween. Thus, a torque cam mechanism may be used in the first and second axial force generation devices 71 and 72.

The sun roller 30 may rotate in the circumferential direction with respect to the shaft 60. The sun roller 30 is disposed at the inside of the planet balls 40 in the inner radial direction. Then, the planet balls 40 are substantially disposed radially at the same interval on the outer peripheral surface of the sun roller 30. Furthermore, the sun roller 30 has contact portions P3 and P4 with respect to each planet ball 40 by using the reference plane as a boundary.

The planet ball 40 is a rolling member that rolls on the outer peripheral surface of the sun roller 30 about a support shaft 41. It is desirable that the planet ball 40 have a complete spherical shape. Also, the planet ball may be formed in a spherical shape at least in the rolling direction. For example, the planet ball may have an oval cross-section like a rugby ball. The contact portions P1 and P2 on the planet ball 40 move in response to the tilting operation (that is, the gear ratio γ) thereof.

The support shaft 41 is concentric with the second rotation axis R2, and both ends protrude from the planet ball 40. The support shaft 41 is formed so as to penetrate the center of the planet ball 40, and supports the planet ball 40 through a bearing in a spinnable manner. The position which is set based on the support shaft 41 is the reference position illustrated in FIG. 1. The support shaft 41 may be swung (tilted) along with the planet ball 40 between the reference position and the position inclined therefrom within the tilting plane. The tilting operation is performed by using the center of the planet ball 40 as a support point within the tilting plane.

In the continuously variable transmission 1, the first power transmission member 10 and the second power transmission member 20 rotate at the same rotation speed (the same rotation number) when the tilting angle of the support shaft 41 and each planet ball 40 is 0° in which the reference position is set, that is, the second rotation axis R2 is parallel to the first rotation axis R1. For this reason, at this time, the rotation ratio (the ratio of the rotation speed or the rotation number) of the first power transmission member 10 with respect to the second power transmission member 20 becomes 1, and the input-output gear ratio γ becomes 1 (γ=1). Meanwhile, when the support shaft 41 and each planet ball 40 are tilted from the reference position, the shortest distance between the second rotation axis R2 and the contact portion P1 changes, and the shortest distance between the second rotation axis R2 and the contact portion P2 changes. For this reason, any one of the first power transmission member 10 and the second power transmission member 20 rotates at a high speed and the other thereof rotates at a low speed compared to the reference position. In the continuously variable transmission 1, the support shaft 41 and the upper planet ball 40 in FIG. 1 are tilted in the counterclockwise direction from the reference position in the drawing paper and the support shaft 41 and the lower planet ball 40 in the same drawing are tilted in the clockwise direction from the reference position, the gear ratio γ changes continuously in the speed increasing direction (γ<1). Further, in the continuously variable transmission 1, when the support shaft 41 and the upper planet ball 40 in FIG. 1 are tilted in the clockwise direction from the reference position in the drawing paper and the support shaft 41 and the lower planet ball 40 in the drawing paper are tilted in the counterclockwise direction from the reference position in the drawing paper, the gear ratio γ changes continuously in the speed decreasing direction (γ>1).

The carrier 50 includes a first guide member 50A, a second guide member 50B, and a gear shift member 50C.

The first guide member 50A is a disk member of which the center axis matches the first rotation axis R1. The first guide member 50A is disposed between the input shaft 11 and each planet ball 40 in the axial direction while being located near the first power transmission member 10 by using the reference plane as a boundary. The first guide member 50A is not rotatable so as not to rotate with respect to the shaft 60 in the circumferential direction. For this reason, the first guide member 50A of this example is fixed to the shaft 60.

Figure 2:
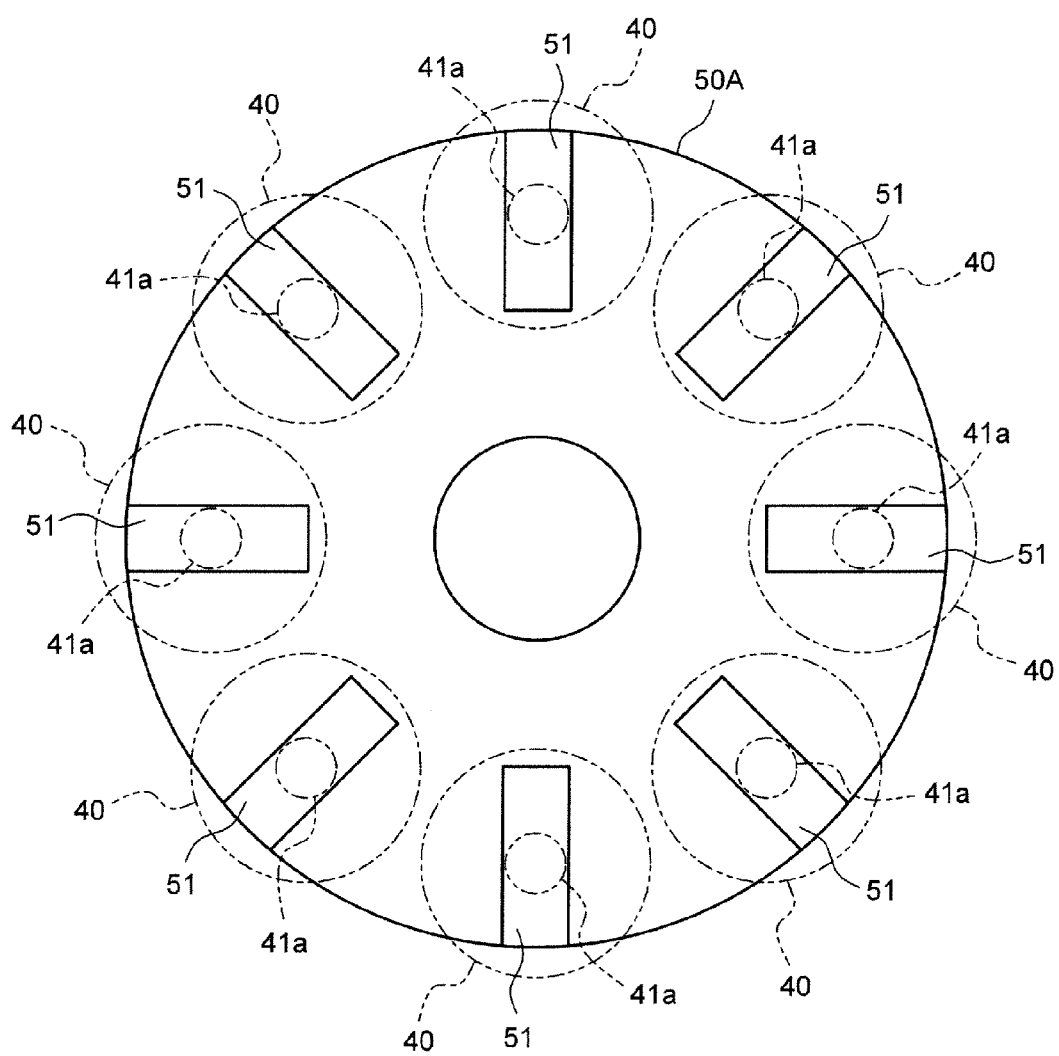
FIG. 2 is a diagram illustrating a first guide member of a carrier.

As illustrated in FIG. 2, the first guide member 50A is provided with a first guide portion 51 which guides a first protrusion portion 41a of the support shaft 41 in the radial direction. FIG. 2 is a diagram illustrating the first guide member 50A when viewed from the planet ball 40 in the axial direction. The first guide portion 51 is a radial groove or a radial notch of which the longitudinal direction (the movement direction of the first protrusion portion 41a on the first guide member 50A during the tilting operation) matches the radial direction, and the first protrusion portion 41a is inserted into the first guide portion 51. That is, the first guide portion 51 is a radial groove or a notch which guides the first protrusion portion 41a in the radial direction. In this example, a gap is formed between the first guide portion 51 and the first protrusion portion 41a in order to smoothly perform the tilting operation of the support shaft 41. The gap is a difference between the width (the groove width or the notch width) of the first guide portion 51 perpendicular to the radial direction and the size (the outer diameter of the first protrusion portion 41a) of the first protrusion portion 41a in the perpendicular direction, and the guide of the first protrusion portion 41a may be narrowed as long as it can be guided during the tilting operation.

Figure 3:
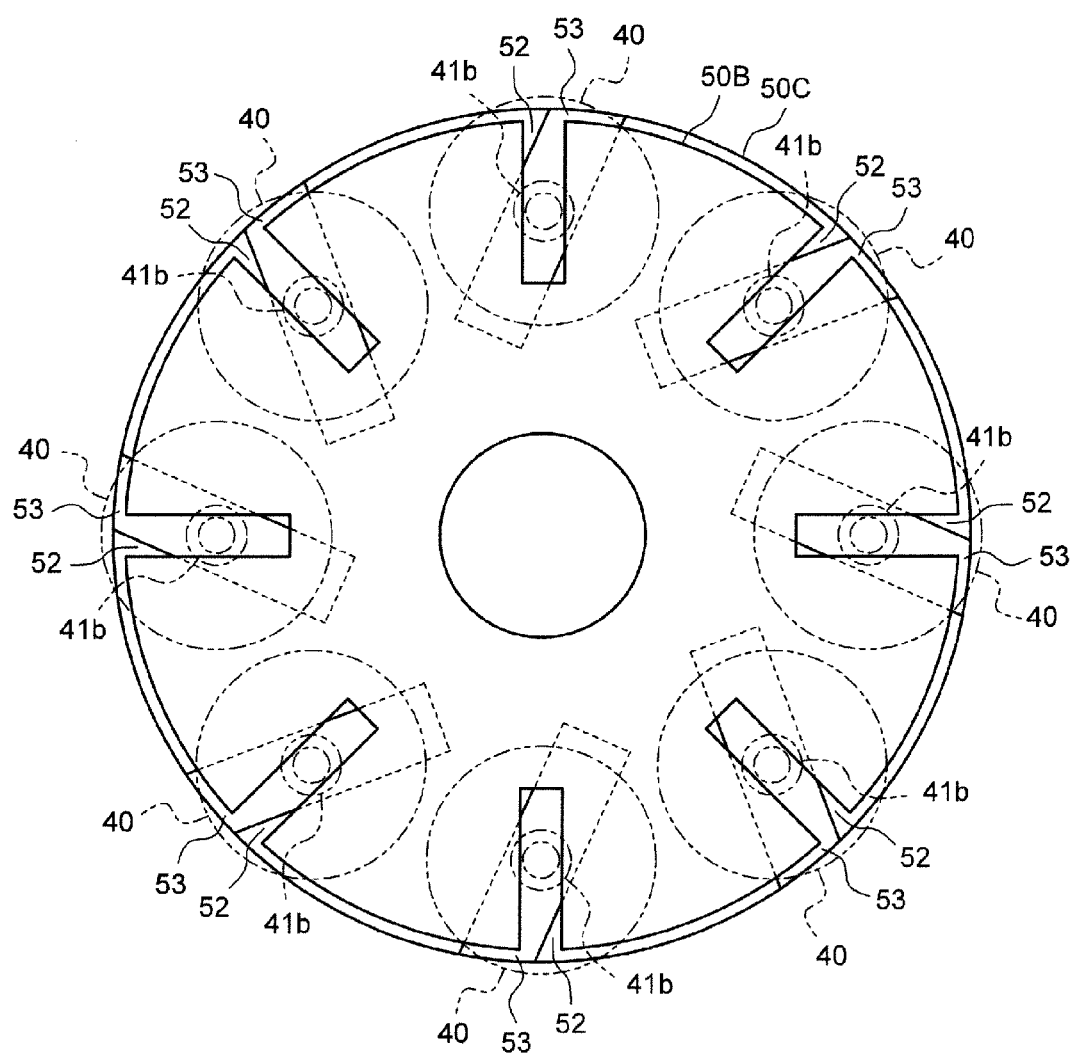
FIG. 3 is a diagram illustrating a second guide member and a gear shift member of the carrier.
Figure 4:
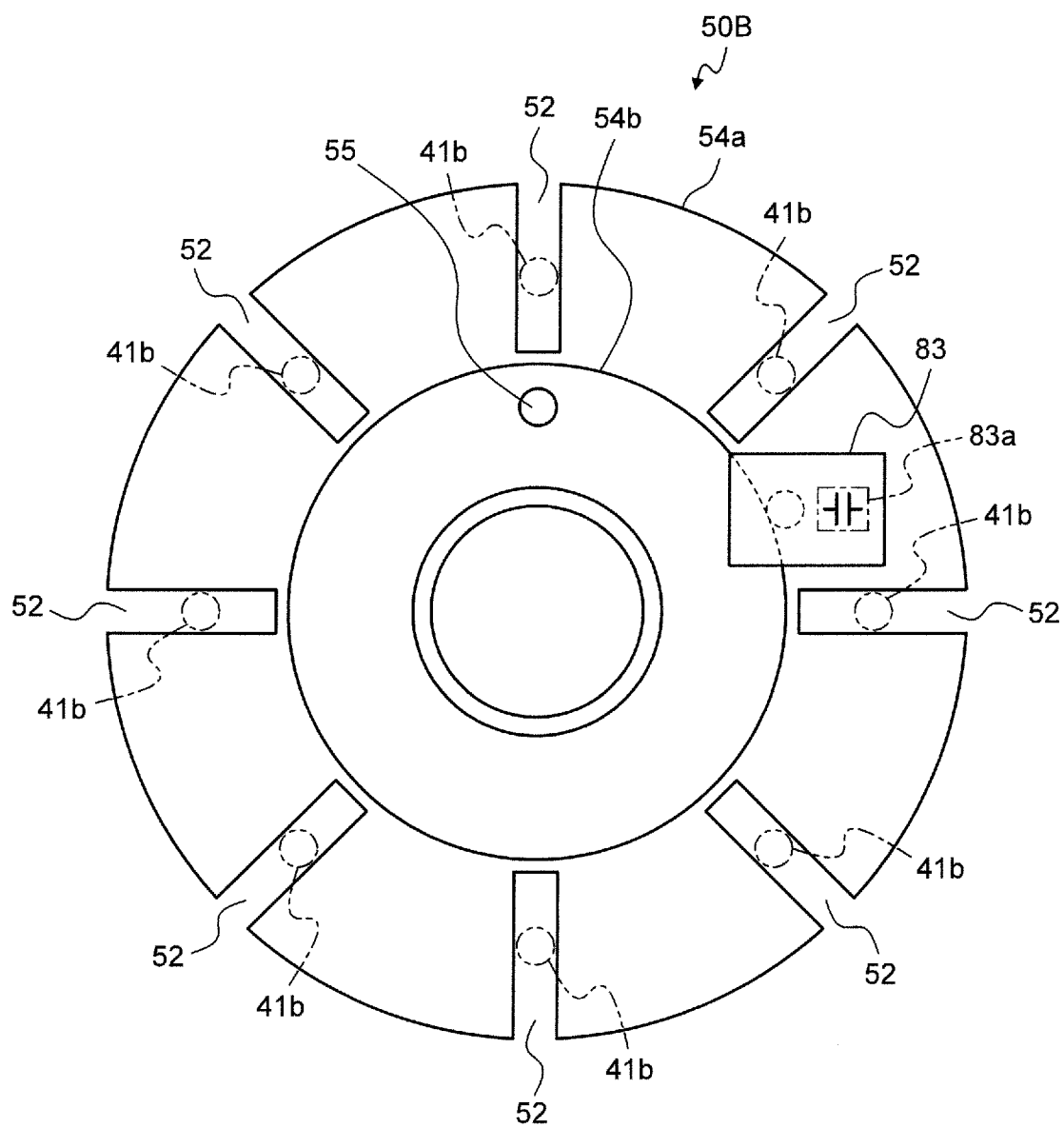
FIG. 4 is a diagram illustrating the second guide member of the carrier.

The second guide member 50B is disposed near the second power transmission member 20 by using the reference plane as a boundary. As illustrated in FIGS. 3 and 4, the second guide member 50B includes first and second disk members 54a and 54b of which the center axes match the first rotation axis R1. The first disk member 54a and the second disk member 54b are disposed so as to face each other in the axial direction with a gap therebetween. The first disk member 54a is disposed near each planet ball 40 in relation to the second disk member 54b. For example, in the inner radial portion of at least one of the first disk member 54a and the second disk member 54b, a cylindrical portion which faces the other is provided, and the cylindrical portion is spline-fitted to the other inner radial portion or the cylindrical portions are spline-fitted to each other so that both disk members are integrated with each other. In this example, the first disk member 54a is provided with a cylindrical portion as illustrated in FIG. 1.

Bearings B1 and B2 illustrated in FIG. 1 are disposed between the inner peripheral surface (the inner peripheral surface of the cylindrical portion) of the second guide member 50B and the outer peripheral surface of the shaft 60. For this reason, the second guide member 50B may rotate with respect to the shaft 60 in the circumferential direction. Furthermore, the second guide member 50B rotates by a force which is transmitted from the other member in the circumferential direction.

As illustrated in FIGS. 3 and 4, the second guide member 50B is provided with a second guide portion 52 which guides a second protrusion portion 41b of the support shaft 41 in the radial direction. FIG. 3 is a diagram illustrating the second guide member 50B and the gear shift member 50C when viewed from the planet ball 40 in the axial direction. FIG. 4 is a diagram illustrating the second guide member 50B when viewed from the opposite side of FIG. 3 in the axial direction. In this example, the first disk member 54a is provided with the second guide portion 52. As will be described later, the second guide portion 52 is provided at a position facing the first guide portion 51 in the axial direction when the rotation of the second guide member 50B is stopped. The second guide portion 52 is a notch of which the longitudinal direction (the movement direction of the second protrusion portion 41b on the second guide member 50B during the tilting operation) matches the radial direction, and the second protrusion portion 41b is inserted into the notch. That is, the second guide portion 52 is a radial notch which guides the second protrusion portion 41b in the radial direction. The second guide portion 52 will be described later in detail.

The gear shift member 50C is a disk member of which the center axis matches the first rotation axis R1. The gear shift member 50C is disposed at the same side as the second guide member 50B by using the reference plane as a boundary. In this example, the gear shift member 50C is disposed between the first disk member 54a and the second disk member 54b so as to be located on the outer peripheral surface of the cylindrical portion of the first disk member 54a. The gear shift member 50C may rotate with respect to the shaft 60 in the circumferential direction. Further, the gear shift member 50C may rotate with respect to the second guide member 50B in the circumferential direction. For this reason, bearings B3 and B4 illustrated in FIG. 1 are disposed between the gear shift member 50C and the second guide member 50B.

Figure 5:
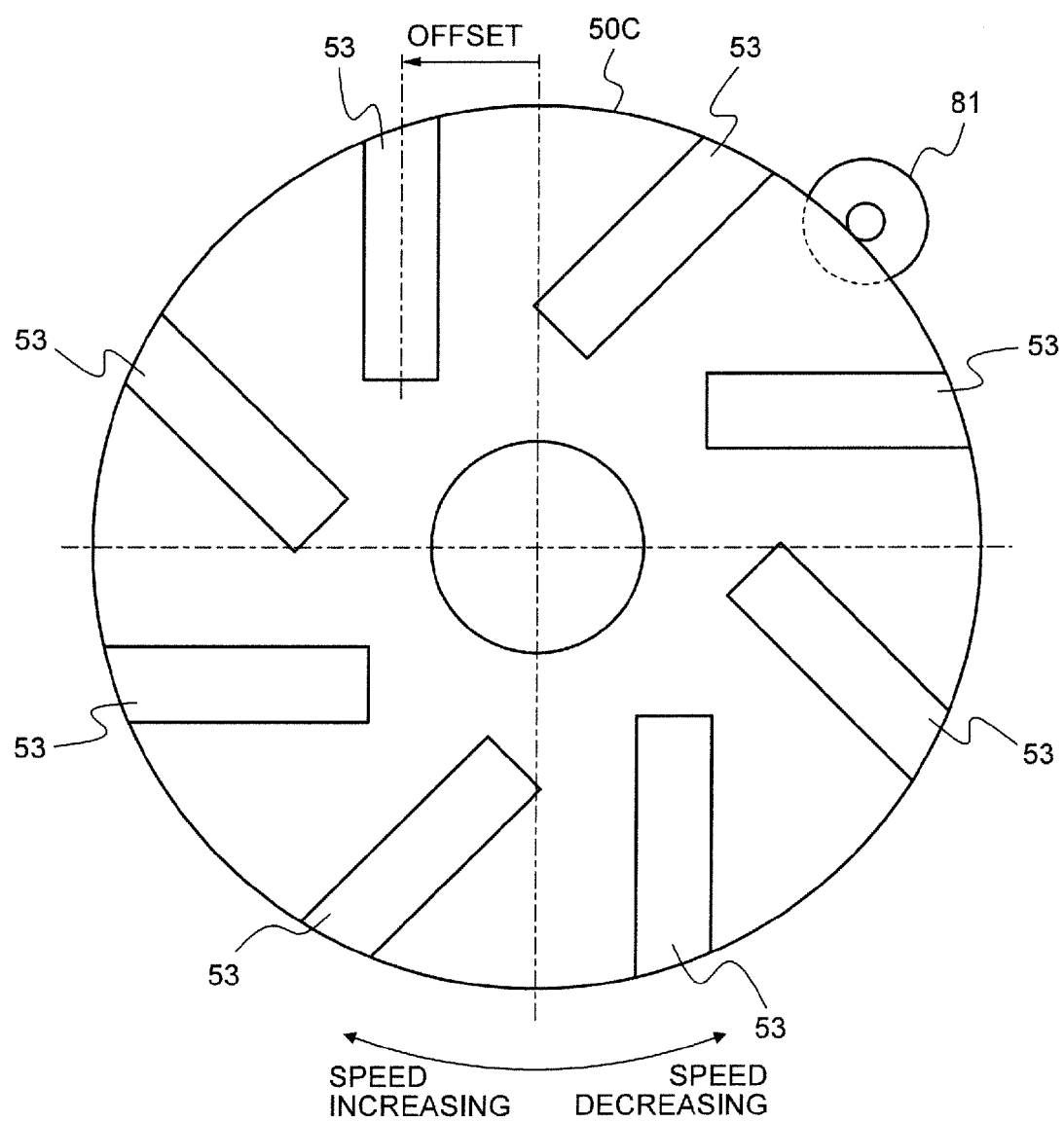
FIG. 5 is a diagram illustrating the gear shift member of the carrier.

An actuator (a first actuator) 81 illustrated in FIG. 5 is used for the relative rotation of the gear shift member 50C. The actuator 81 includes, for example, a power source such as a motor and a gear portion such as a worm gear which transmits power to a gear portion of the outer peripheral portion of the gear shift member 50C. FIG. 5 is a diagram illustrating the gear shift member 50C when viewed from the planet ball 40 in the axial direction.

As illustrated in FIGS. 3 and 5, the gear shift member 50C is provided with a gear change portion 53 into which the second protrusion portion 41b of the support shaft 41 is inserted. The gear change portion 53 is a groove or a notch. The actuator 81 rotates the gear shift member 50C when the input-output gear ratio γ is changed. Accordingly, in the support shaft 41, the second protrusion portion 41b moves along the gear change portion 53. At that time, the movement of the support shaft 41 is regulated by the first guide portion 51 and the second guide portion 52. For this reason, since the support shaft 41 moves in the radial direction with the rotation of the gear shift member 50C, the tilting operation is performed along the tilting plane along with the planet ball 40.

Furthermore, a part of a first casing member CA1 that contains a main component of the continuously variable transmission 1 is disposed between the gear shift member 50C and the second disk member 54b (FIG. 1). A bearing B5 is disposed between the first casing member CA1 and the outer peripheral surface of the cylindrical portion of the first disk member 54a so as not to disturb the rotation of the second guide member 50B.

Here, a forward-backward movement switching mechanism (not illustrated) is provided between the input shaft 11 and the power source. For this reason, the rotation direction of the input shaft 11 is different between the forward movement direction and the backward movement direction of the vehicle. Here, the rotation of the first and second power transmission members 10 and 20 in the forward movement direction is defined as the normal rotation, and the rotation of the first and second power transmission members 10 and 20 in the backward movement direction is defined as the reverse rotation.

Figure 6:
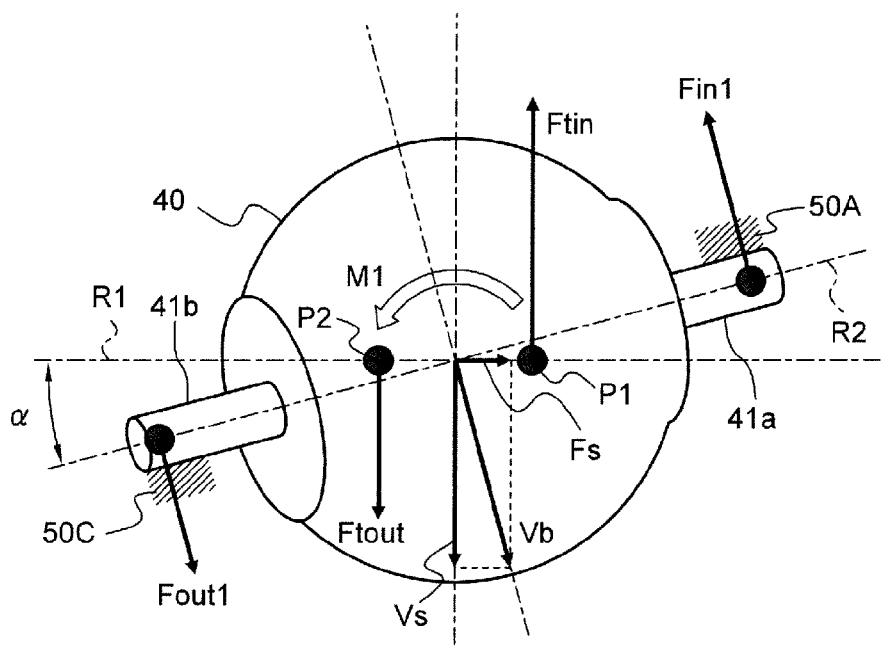
FIG. 6 is a diagram illustrating a force applied to a planet ball during the forward movement and a force generated in a support shaft with the force.
Figure 7:
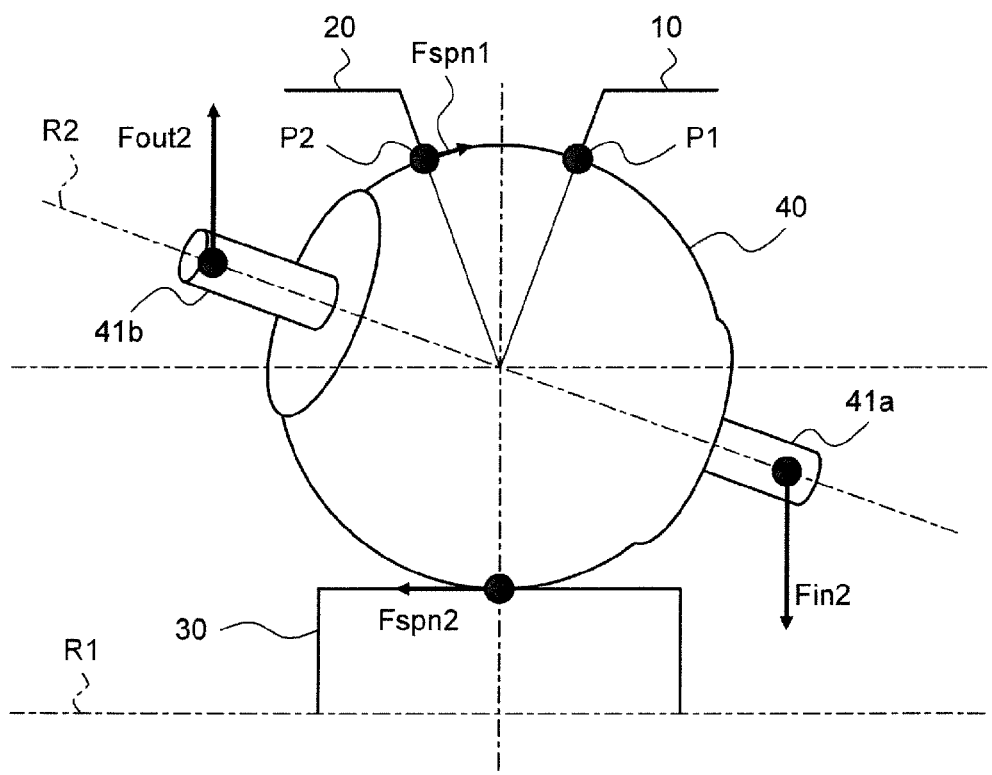
FIG. 7 is a diagram illustrating a force applied to the planet ball during the forward movement and a force generated in the support shaft with the force.
Figure 8:
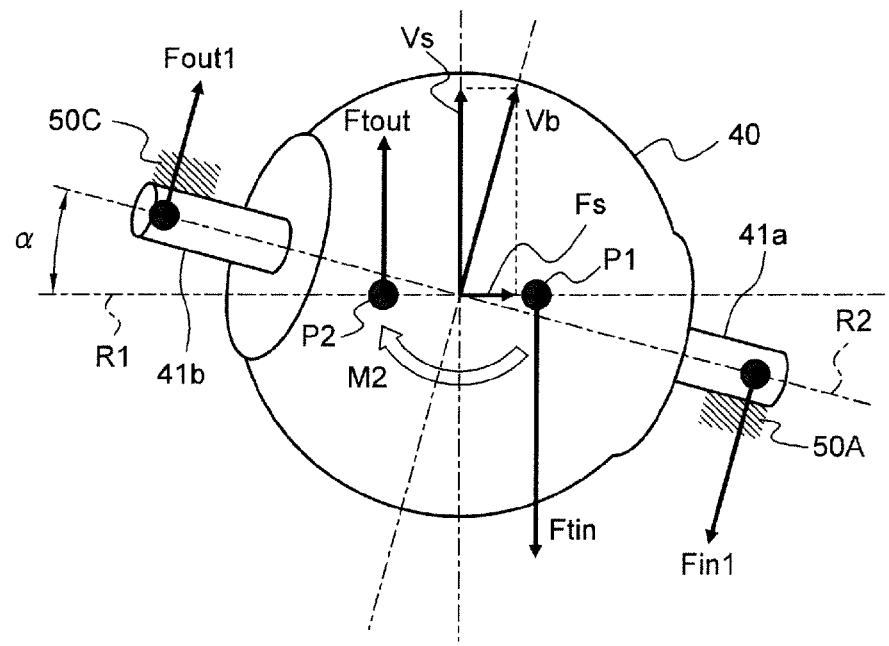
FIG. 8 is a diagram illustrating a force applied to the planet ball during the backward movement and a force generated in the support shaft with the force.
Figure 9:
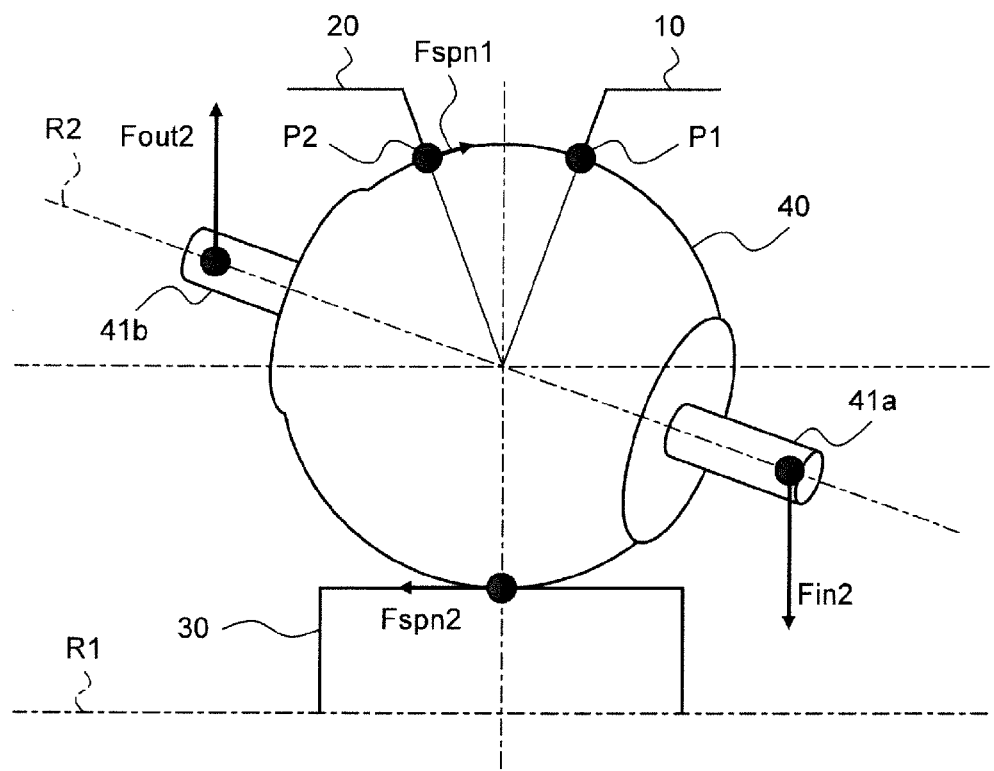
FIG. 9 is a diagram illustrating a force applied to the planet ball during the backward movement and a force generated in the support shaft with the force.

FIGS. 6 and 7 illustrate a force which is applied to the planet ball 40 during the forward movement (during the normal rotation of the first and second power transmission members 10 and 20) and a force which is generated in the support shaft 41 (the first protrusion portion 41a and the second protrusion portion 41b) with the force. Further, FIGS. 8 and 9 illustrate a force which is applied to the planet ball 40 during the backward movement (during the reverse rotation of the first and second power transmission members 10 and 20) and a force which is generated in the support shaft 41 with the force. Furthermore, only one contact portion is depicted between the sun roller 30 and the planet ball 40 for convenience of the description in these drawings.

In FIGS. 6 and 8, "Ftin" indicates a traction force at the contact portion P1. "Ftout" indicates a traction force at the contact portion P2. A moment (a normal rotation moment M1 and a reverse rotation moment M2) is generated in the planet ball 40 in a direction different from the tilting direction by the traction forces Ftin and Ftout generated in the opposite directions. For this reason, a skew in which the second rotation axis R2 is deviated while being inclined with respect to the first rotation axis R1 (that is, the second rotation axis R2 is deviated from the tilting plane) occurs in the planet ball 40 and the support shaft 41. When the skew occurs, a force Fin1 which is applied to one side wall of the first guide portion 51 is generated in the first protrusion portion 41a of the support shaft 41, and a force Fout1 which is applied to one side wall of the gear change portion 53 is generated in the second protrusion portion 41b of the support shaft 41.

Further, these drawings illustrate a state where the gear ratio γ is changed in a speed decreasing direction. For this reason, a spin force Fspn1 in the tilting direction is applied to the planet ball 40 with respect to the second power transmission member 20 (FIGS. 7 and 9). Further, "Vs" and "Vb" of FIGS. 6 and 8 respectively indicate the speed vectors of the sun roller 30 and the planet ball 40. A thrust force Fs which is generated in response to the speed vectors Vs and Vb is applied from the planet ball 40 to the sun roller 30. Thus, a spin force Fspn2 in the tilting direction is applied to the planet ball 40 with respect to the sun roller 30 (FIGS. 7 and 9). Then, due to the spin forces Fspn1 and Fspn2, a force Fin2 which is generated in the inner radial direction of the first guide member 50A is applied to the first protrusion portion 41a, and a force Fout2 which is generated in the outer radial direction of the gear shift member 50C is applied to the second protrusion portion 41b. The directions of the forces Fin2 and Fout2 are set to the same direction regardless of the normal rotation and the reverse rotation of the first and second power transmission members 10 and 20 at the same gear ratio γ.

The gear change portion 53 is formed in a shape in which the forces applied between the second protrusion portion 41b and the side wall of the gear change portion 53 by the forces Fout1 and Fout2 in the second protrusion portion 41b match each other during the normal rotation of the first and second power transmission members 10 and 20. Specifically, as illustrated in FIGS. 3 and 5, the gear change portion 53 (the groove or the notch) is formed in a shape in which the longitudinal direction (the movement direction of the second protrusion portion 41b on the gear shift member 50C during the tilting operation) is inclined in the circumferential direction with respect to the radial direction. The rotation center for the inclining operation is set in the outer radial direction in relation to the first rotation axis R1. In other words, the gear change portion 53 corresponds to a radial groove or a radial notch like the first guide portion 51 or the second guide portion 52 which is offset by a predetermined amount in a direction perpendicular to the radial direction. The offset amount is set to an amount in which the forces applied between the second protrusion portion 41b and the side wall of the gear change portion 53 are balanced during the normal rotation.

FIG. 10 is a diagram illustrating the forces applied therebetween during the normal rotation. A resultant force Fg which is obtained by the component forces Fg1 and Fg2 is applied from the second protrusion portion 41b to the side wall of the gear change portion 53. Then, a resultant force −Fg which is obtained by the component forces −Fg1 and −Fg2 is applied from the side wall of the gear change portion 53 to the second protrusion portion 41b. During the normal rotation, the forces applied between the second protrusion portion 41b and the side wall of the gear change portion 53 match each other regardless of the gear ratio γ. For this reason, the first protrusion portion 41a is locked to one side wall of the first guide portion 51 and the second protrusion portion 41b is locked to one side wall of the gear change portion 53 during the normal rotation, so that the skew of the support shaft 41 and the planet ball 40 is stopped at a skew angle α. Thus, the skew is stabilized during the normal rotation.

Figure 11:
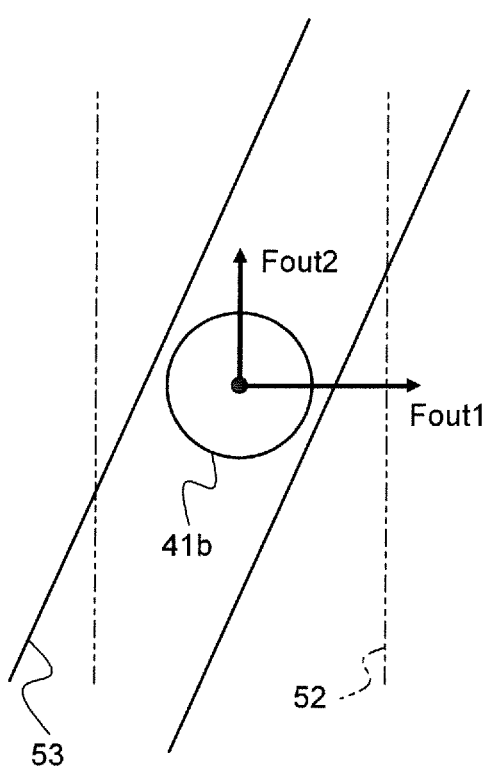
FIG. 11 is a diagram illustrating a force applied between the second protrusion portion and the side wall of the gear change portion during the reverse rotation.

Further, FIG. 11 illustrates the forces applied between the second protrusion portion 41b and the side wall of the gear change portion 53 during the reverse rotation of the first and second power transmission members 10 and 20. During the reverse rotation, only the direction of the force Fout1 among the forces Fout1 and Fout2 in the second protrusion portion 41b is reversed as described above. For this reason, it is difficult to match the forces applied between the second protrusion portion 41b and the side wall of the gear change portion 53 during the reverse rotation. As a result, a divergence in skew angle α occurs. Then, when a divergence in skew angle α occurs, the support shaft 41 is bitted into the first guide portion 51 or the gear change portion 53, and hence there is a possibility that the support shaft 41 may be locked. That is, there is a possibility that the power may not be transmitted or the gear ratio γ may not be changed after the transmission of the power during the reverse rotation.

Therefore, in the embodiment, a divergence in skew angle α during the reverse rotation is suppressed when the second guide portion 52 is formed in a shape as below.

In order to suppress a divergence in skew angle α during the reverse rotation, it is desirable to suppress the occurrence of the skew during the reverse rotation by suppressing a deviation of the second rotation axis R2 from the tilting plane during the reverse rotation. For example, a difference (hereinafter, referred to as a "first difference") between the width (the groove width or the notch width) of the first guide portion 51 in the radial direction and the size (the outer diameter of the first protrusion portion 41a) of the first protrusion portion 41a in the perpendicular direction is set to a size in which a deviation of the first protrusion portion 41a from the tilting plane of the rotation axis (the second rotation axis R2) is prohibited. Further, a difference (hereinafter, referred to as a "second difference") between the width (the notch width) of the second guide portion 52 in the radial direction and the size (the outer diameter of the second protrusion portion 41b) of the second protrusion portion 41b in the perpendicular direction is set to a size in which a deviation of the second protrusion portion 41b from the tilting plane of the rotation axis (the second rotation axis R2) is prohibited. Then, the rotation of the second guide member 50B in the circumferential direction is prohibited during the reverse rotation. Accordingly, since the skew does not occur during the reverse rotation, a divergence in skew angle α may be suppressed.

However, the state where the skew does not occur indicates a state where the first difference and the second difference both become zero. For this reason, in this case, there is a possibility that the support shaft 41 may not be smoothly tilted due to the first protrusion portion 41a caught by each of the side walls of the first guide portion 51 or the second protrusion portion 41b caught by each of the side walls of the second guide portion 52. Therefore, in the embodiment, the second difference is set so that the second protrusion portion 41b is locked by the gear change portion 53 and the second guide portion 52 during the reverse rotation. Then, the rotation of the second guide member 50B in the circumferential direction is prohibited during the reverse rotation.

Here, as described above, the second guide member 50B may rotate with respect to the shaft 60 in the circumferential direction in that the force Fout1 of the second protrusion portion 41b is applied to the side wall of the second guide portion 52. For this reason, when the rotation of the second guide member 50B is not stopped, the skew occurs regardless of the degrees of the first difference and the second difference during the normal rotation or the reverse rotation in the continuously variable transmission 1. However, a moment that promotes the tilting operation may be generated in the support shaft 41 and the planet ball 40 by the forces Fin2 and Fout2 in accordance with the occurrence of the skew. For this reason, it is desirable to generate the skew by allowing the rotation of the second guide member 50B during the normal rotation. Thus, the continuously variable transmission 1 is provided with a rotation control device which prohibits the rotation of the second guide member 50B during the reverse rotation and allows the rotation of the second guide member 50B during the normal rotation.

The rotation control device includes a first engagement portion which is provided in the second guide member 50B, a second engagement portion which engages with the first engagement portion so as to prohibit the rotation of the second guide member 50B, and an actuator (a second actuator) 82 which operates the second engagement portion. The first engagement portion in this example is provided in the second disk member 54b of the second guide member 50B. Further, the second engagement portion and the actuator 82 are provided in a second casing member CA2 that contains the second disk member 54b.

When the first engagement portion and the second engagement portion engage with each other, the rotation of the second guide member 50B is prohibited even when the force Fout1 of the second protrusion portion 41b is applied to the side wall of the second guide portion 52. The first guide portion 51 and the second guide portion 52 face each other in the axial direction when the first engagement portion and the second engagement portion engage with each other. Meanwhile, the rotation of the second guide member 50B caused by the force Fout1 is allowed when the first engagement portion and the second engagement portion are separated from each other. For this reason, when the actuator 82 is controlled by a control device 100, the second engagement portion is operated so that the first engagement portion and the second engagement portion engage with each other during the reverse rotation and the second engagement portion is operated so that the engagement state between the first engagement portion and the second engagement portion is released during the normal rotation.

In this example, a hole portion 55 that is formed in the second disk member 54b is set as a first engagement portion and a pin member 91 that may be inserted into or extracted therefrom the hole portion 55 is set as a second engagement portion (FIGS. 1 and 4). The hole portion 55 is formed in the outer radial portion of the second disk member 54b so as to receive the rotation force of the second guide member 50B in the circumferential direction in accordance with the generation of the force Fout1 of the second protrusion portion 41b. Furthermore, the hole portion 55 may be formed in a protrusion portion which extends in the outer radial direction from the outer peripheral surface of the second disk member 54b.

Figure 12:
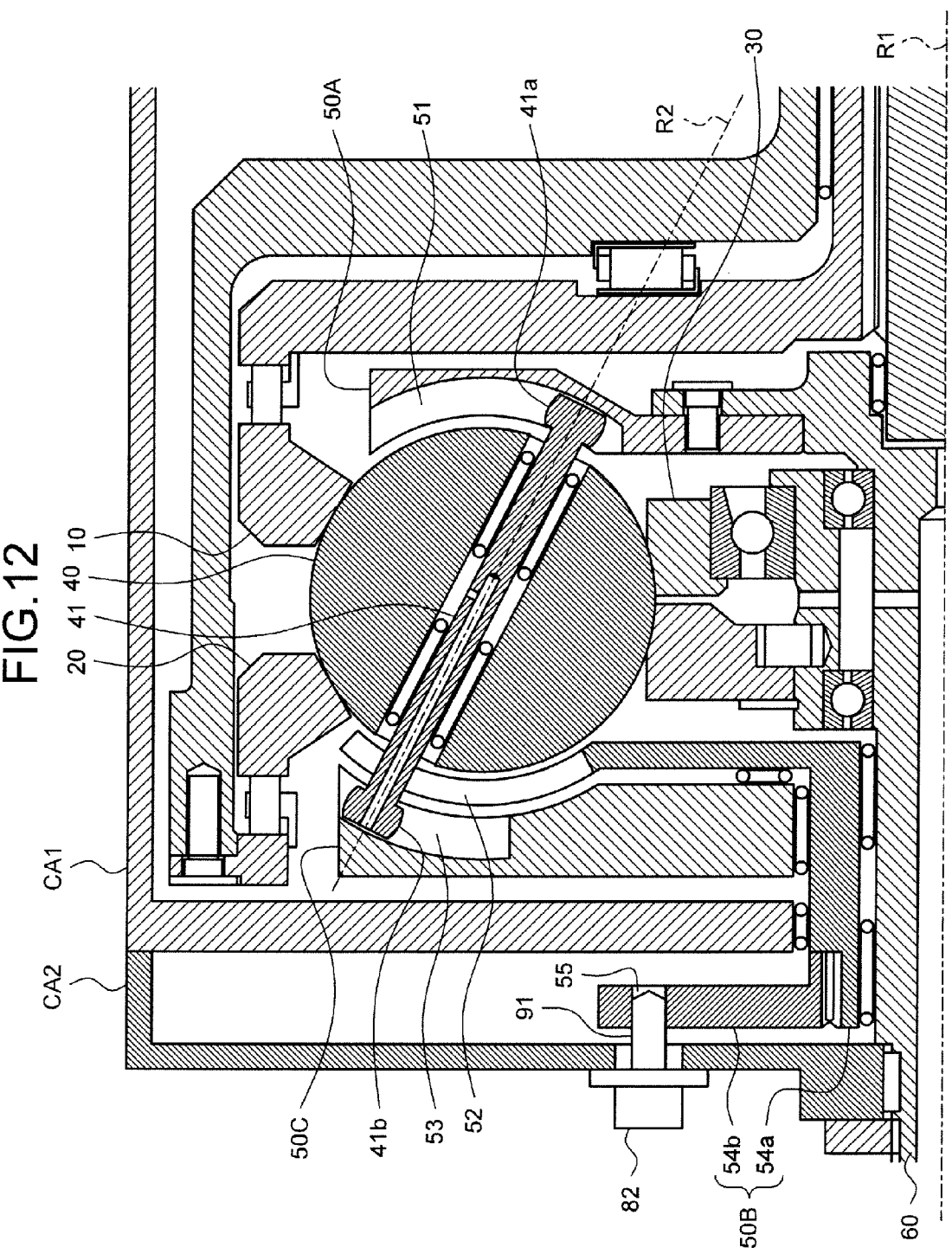
FIG. 12 is a diagram illustrating a state of the continuously variable transmission during the reverse rotation.

For example, the actuator 82 includes an electromagnetic valve. Thus, when the electromagnetic valve is turned on, the pin member 91 is pushed out so as to be inserted into the hole portion 55. When the electromagnetic valve is turned off, the pin member 91 is returned so as to be extracted from the hole portion 55. As illustrated in FIG. 1, the actuator 82 allows the rotation of the second guide member 50B by extracting the pin member 91 from the hole portion 55 during the normal rotation. Meanwhile, as illustrated in FIG. 12, the actuator 82 prohibits the rotation of the second guide member 50B by inserting the pin member 91 into the hole portion 55 during the reverse rotation. It is desirable to decrease a difference between the hole diameter of the hole portion 55 and the outer diameter of the pin member 91 in a degree that the insertion or the extraction of the pin member 91 is not disturbed in order to suppress the rotation of the second guide member 50B in the circumferential direction after the engagement.

The second guide member 50B is rotated by the force Fout1 of the second protrusion portion 41b during the normal rotation. For this reason, there is a need to rotate the second guide member to a position where the pin member 91 is inserted into the hole portion 55 during the reverse rotation. Thus, the rotation control device is provided with an actuator (a third actuator) 83 which transmits a drive force to the second guide member 50B during the reverse rotation so as to rotate the second guide member 50B to a position (a position where the first engagement portion and the second engagement portion may engage with each other) where the pin member 91 may be inserted into the hole portion 55 (FIG. 4).

The actuator 83 includes, for example, a power source such as a motor and a gear portion such as a worm gear which transmits the power to the gear portion of the outer peripheral portion of the second disk member 54b. The actuator 83 is controlled by the control device 100 so as to rotate the second guide member 50B to a position where the pin member 91 and the hole portion 55 face each other in the axial direction during the reverse rotation. At that time, the target rotation angle of the second guide member 50B may be determined based on, for example, a detection value of a rotation angle sensor 92 that can detect the rotation angle of the second guide member 50B. For example, the control device 100 may detect the rotation angle of the second guide member 50B during the normal rotation and may determine the same rotation angle in the opposite direction as the target rotation angle in the reverse rotation. Further, the target rotation angle may be determined based on a detection value of a hole position sensor (not illustrated) that detects the position of the hole portion 55. The hole position sensor is, for example, an infrared sensor or a photoelectric sensor and is provided at the front end of the pin member 91. For example, the control device 100 rotates the second guide member 50B until the hole portion 55 is detected by the hole position sensor during the reverse rotation.

The actuator 83 may rotate the second guide member 50B during the normal rotation. At that time, the rotation angle of the second guide member 50B caused by the force Fout1 of the second protrusion portion 41b needs to be given. However, it is difficult to estimate the rotation angle. For this reason, the second guide member 50B is rotated only by the force Fout1 of the second protrusion portion 41b while the power of the actuator 83 is not used during the normal rotation. However, in a configuration in which the actuator 83 is normally mechanically connected from the power source to the gear portion, the second guide member 50B may not be rotated by the force Fout1. Thus, the actuator 83 is provided with a power connection-disconnection device 83a which interrupts the transmission of the power to the second guide member 50B during the normal rotation. The power connection-disconnection device 83a is, for example, a dog clutch or a friction clutch. When the control device 100 controls the power connection-disconnection device 83a of the actuator 83, the power connection-disconnection device 83a is released so that the transmission of the power to the second guide member 50B is not allowed during the normal rotation and the power connection-disconnection device 83a is engaged so that the transmission of the power to the second guide member 50B is allowed during the reverse rotation. Thus, the second guide member 50B may be rotated by the force Fout1 of the second protrusion portion 41b during the normal rotation.

The second difference is set so that the second protrusion portion 41b is locked to the gear change portion 53 and the second guide portion 52 during the reverse rotation while the rotation of the second guide member 50B is stopped. When the second protrusion portion 41b is locked, the first protrusion portion 41a is also locked to the side wall of the first guide portion 51. Accordingly, the support shaft 41 is restrained so that the movement thereof is regulated, and hence a divergence in skew angle α hardly occurs. Specifically, the second difference is set to a size in which the second protrusion portion 41b does not contact the side wall of the gear change portion 53 in the direction of the force Fout1 while the second protrusion portion 41b contacts the side wall of the second guide portion 52 by the force Fout1 (the force Fout1 in response to the moment M2 causing the skew during the reverse rotation) of the second protrusion portion 41b in the circumferential direction during the reverse rotation. Accordingly, the second protrusion portion 41b is locked to the second guide portion 52 in the direction (the circumferential direction) of the force Fout1 and is locked to the gear change portion 53 by the force Fout in the radial direction during the reverse rotation.

For example, in this example, the second guide portion 52 is disposed between each planet ball 40 and the gear shift member 50C. For this reason, the second difference is set to be smaller than a difference between the width of the gear change portion 53 perpendicular to the radial direction and the size (the outer diameter of the second protrusion portion 41b) of the second protrusion portion 41b in the perpendicular direction. However, the second difference is determined within a range where the second protrusion portion 41b does not contact the side wall of the gear change portion 53 in the direction of the force Fout1 while the second protrusion portion 41b contacts the side wall of the second guide portion 52 by the force Fout1 by considering a distance between the second guide portion 52 and the gear change portion 53 in the axial direction in the setting.

Further, the second difference may be set to a size in which a deviation of the second protrusion portion 41b from the tilting plane of the rotation axis decreases during the reverse rotation in a range where the tilting operation is not disturbed. That is, the second difference may be set to a size in which the skew angle (the deviation angle of the support shaft 41 with respect to the tilting plane) of the support shaft 41 and the planet ball 40 during the reverse rotation is suppressed as small as possible in a range where the tilting operation is not disturbed. A state where the tilting operation is not disturbed indicates a state where the operation of the support shaft 41 along the first guide portion 51 and the second guide portion 52 is performed without any failure during the tilting operation. The operation with any failure indicates a state where the support shaft 41 may not be smoothly tilted. Accordingly, the second protrusion portion 41b contacts the side wall of the second guide portion 52 in the direction (the circumferential direction) of the force Fout1, but does not contact the side wall of the gear change portion 53 during the reverse rotation. For example, the second difference is set to a size in which the skew angle in the reverse rotation is set as small as possible within a range in which the tilting operation is not disturbed. Thus, it is desirable to set the second difference to a size close to zero as much as possible within the range in which the tilting operation is not disturbed. For example, the second difference is set to a size in which the force Fout1 is applied from the second protrusion portion 41b to the side wall of the second guide portion 52 in accordance with the occurrence of the moments M1 and M2 causing the skew.

For example, such a second difference may be realized by decreasing the width of the second guide portion 52 or may be realized by increasing the size (the outer diameter) of the second protrusion portion 41b.

Figure 13:
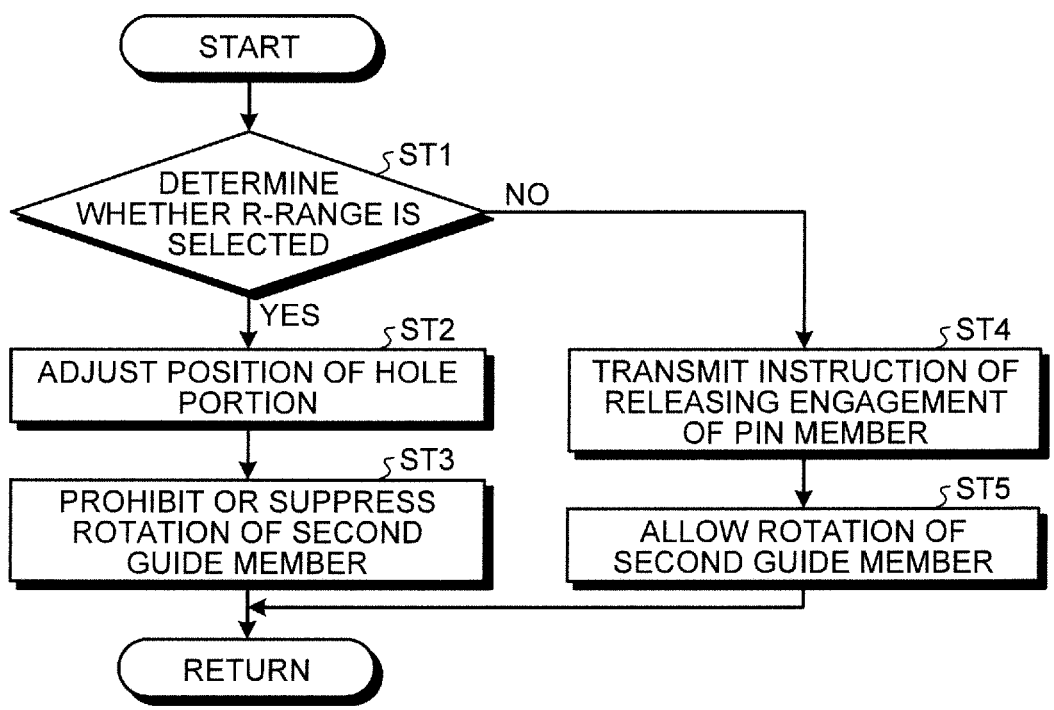
FIG. 13 is a flowchart illustrating an operation of a gear shift control of the continuously variable transmission according to the embodiment of the invention.

For example, as illustrated in FIG. 13, the control device (ECU) 100 of the continuously variable transmission 1 determines whether an R-range for the backward movement is selected as a gear shift range (step ST1).

In the case of the R-range, the control device 100 controls the actuator 83 so that the second guide member 50B rotates to a position where the pin member 91 and the hole portion 55 face each other in the axial direction. That is, in this case, the position of the hole portion 55 is adjusted (step ST2).

Then, after the position is adjusted, the control device 100 controls the actuator 82 so that the pin member 91 is inserted into the hole portion 55 and hence the rotation of the second guide member 50B is prohibited (step ST3). Thus, since the skew is suppressed while the support shaft 41 is restrained at this time, a divergence in skew angle α is suppressed.

Meanwhile, when the R-range is not selected, the control device 100 transmits an instruction of releasing the engagement of the pin member 91 to the actuator 83 (step ST4). Accordingly, when the pin member 91 is extracted from the hole portion 55, the actuator 83 maintains the current state while the electromagnetic valve is turned off. Meanwhile, when the pin member 91 is inserted into the hole portion 55, the electromagnetic valve is turned off, and the pin member 91 is extracted from the hole portion 55. Then, the control device 100 controls the power connection-disconnection device 83a of the actuator 83 so that the rotation of the second guide member 50B is allowed (step ST5). Thus, since the skew is stopped at the skew angle α at this time, a divergence in skew angle α is suppressed.

As described above, the continuously variable transmission 1 of the embodiment may suppress a divergence in skew angle α while assisting the tilting operation in accordance with the occurrence of the skew during the forward movement (during the normal rotation of the first and second power transmission members 10 and 20). Further, the continuously variable transmission 1 may suppress a divergence in skew angle α even during the backward movement (during the reverse rotation of the first and second power transmission members 10 and 20). Thus, in the continuously variable transmission 1, the lock of the support shaft 41 may be prevented during the reverse rotation. Accordingly, the power of the power source may be transmitted to the drive wheel when the R-range is selected and the gear ratio γ may be changed during the forward movement after the R-range is selected.

Furthermore, in the above-described example, since the first disk member 54a is disposed between each planet ball 40 and the gear shift member 50C, the second guide portion 52 is notched. However, when the gear shift member 50C is disposed between the first disk member 54a and each planet ball 40, the second guide portion 52 may be formed as a radial groove of which the longitudinal direction matches the radial direction. Further, since the length (the axial length) of the continuously variable transmission 1 in the axial direction may be shortened in such an arrangement, the second guide member 50B may be formed only by the first disk member 54a. However, it is desirable to form the first engagement portion (the hole portion 55) in the second guide member 50B (for example, the first disk member 54a except for the cylindrical portion) at that time.

The continuously variable transmission according to the embodiment of the invention may suppress a divergence in skew angle in accordance with the setting of the difference between the second guide portion and the second protrusion portion by prohibiting the rotation of the second guide member at a position where the first guide portion and the second guide portion face each other during the backward movement (during the reverse rotation of the first and second power transmission components). Thus, in the continuously variable transmission, since the lock of the support shaft may be prevented during the backward movement, the power of the power source may be transmitted to a drive wheel when an R-range is selected and the gear ratio may be changed during the forward movement after the R-range is selected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A continuously variable transmission comprising:
   a first power transmission component relatively rotatable around a first rotation axis;
   a second power transmission component relatively rotatable around the first rotation axis;
   a third power transmission component relatively rotatable around the first rotation axis;
   a plurality of rolling components each of which are relatively rotatable around a respective second rotation axis, the plurality of rolling components are radially disposed at a plurality of positions about the first rotation axis on an outer peripheral surface of the third power transmission component, and the plurality of rolling components are sandwiched between the first power transmission component and the second power transmission component disposed to face each other;
   a support shaft for each of the plurality of rolling components which is concentric with the respective second rotation axis provided for each of the plurality of rolling components, each support shaft having a first protrusion portion and a second protrusion portion, the first protrusion portion of each support shaft and the second protrusion portion of each support shaft protrude from each of the plurality of rolling components;
   a first guide member that includes a plurality of first guide portions, the first protrusion portion of each support shaft is inserted into a respective one of the plurality of first guide portions, the plurality of first guide portions guide the first protrusion portion of each support shaft in a radial direction with respect to the first rotation axis, the first guide member is not rotatable;
   a gear shift member that includes a plurality of gear change portions, the second protrusion portion of each support shaft is inserted into a respective one of the plurality of gear change portions, a longitudinal direction of each of the plurality of gear change portions is tilted with respect to the radial direction so that forces applied between the second protrusion portion of each support shaft and a side wall of the respective one of the plurality of gear change portions match each other during normal rotation of the first power transmission component and the second power transmission component, the gear shift member is rotatable about the first rotation axis;
   a first actuator which tilts each of the plurality of rolling components by moving the second protrusion portion of each support shaft along the respective one of the plurality of gear change portions with rotation of the gear shift member at a time an input-output gear ratio is changed;
   a second guide member that includes a plurality of second guide portions, the second protrusion portion of each support shaft is inserted into a respective one of the plurality of second guide portions, the plurality of second guide portions guide the second protrusion portion of each support shaft in the radial direction, the second guide member is rotatable about the first rotation axis by applying a first force to a side wall of each of the plurality of second guide portions; and a second actuator which prohibits rotation of the second guide member at a position where the plurality of first guide portions and the plurality of second guide portions face each other in an axial direction of the first rotation axis by engaging a second engagement portion of the second guide member with a first engagement portion of the second guide member during reverse rotation of the first power transmission component and the second power transmission component and allows rotation of the second guide member by operating the second engagement portion so that an engagement state with respect to the first engagement portion is released during the normal rotation of the first power transmission component and the second power transmission component.

2. The continuously variable transmission according to claim 1,
wherein a difference between a width of the respective one of the plurality of second guide portions in a perpendicular direction that is perpendicular to the radial direction and the axial direction, and a size of the second protrusion portion of each support shaft in the perpendicular direction is set to a size in which the second protrusion portion of each support shaft does not contact the side wall of the respective one of the plurality of gear change portions in a direction of a second force applied to the second protrusion portion of each support shaft in response to a moment causing a skew of the respective second rotation axis with respect to the first rotation axis during the reverse rotation while the second protrusion portion of each support shaft contacts the side wall of the respective one of the plurality of second guide portions by the second force.

3. The continuously variable transmission according to claim 2,
wherein at a time in which each support shaft is in the axial direction, the difference between the width of the respective one of the plurality of second guide portions in the perpendicular direction and the size of the second protrusion portion of each support shaft in the perpendicular direction is set to be smaller than a difference between a width of the respective one of the plurality of gear change portions in the perpendicular direction and the size of the second protrusion portion of each support shaft in the perpendicular direction.

4. The continuously variable transmission according to claim 3,
wherein the first engagement portion is a hole portion and the second engagement portion is a pin member that is inserted into or extracted from the hole portion.

5. The continuously variable transmission according to claim 2,
wherein the first engagement portion is a hole portion and the second engagement portion is a pin member that is inserted into or extracted from the hole portion.

6. The continuously variable transmission according to claim 1,
wherein the first engagement portion is a hole portion and the second engagement portion is a pin member that is inserted into or extracted from the hole portion.

* * * * *